United States Patent [19]

Brown et al.

[11] Patent Number: 4,693,550
[45] Date of Patent: Sep. 15, 1987

[54] CRIMP TYPE FIBER OPTIC CONNECTOR

[75] Inventors: Vincent B. Brown, Prospect Heights; Sherman W. McGrew, Chicago, both of Ill.

[73] Assignee: Methode Electronics, Inc., Chicago, Ill.

[21] Appl. No.: 710,317

[22] Filed: Mar. 11, 1985

[51] Int. Cl.⁴ ............................................. G02B 6/36
[52] U.S. Cl. .............................. 350/96.20; 350/96.21
[58] Field of Search ............... 350/96.20, 96.21, 96.22, 350/320

[56] References Cited

U.S. PATENT DOCUMENTS

| 3,883,681 | 5/1975  | Campbell        | 350/96.20 X |
| 3,972,585 | 8/1976  | Dalgleish et al.| 350/96.21   |
| 4,190,317 | 2/1980  | Makuch          | 350/96.20   |
| 4,355,862 | 10/1982 | Kock            | 350/96.20   |
| 4,447,121 | 5/1984  | Cooper et al.   | 350/96.21   |
| 4,521,383 | 12/1983 | Carlsen         | 350/96.21   |
| 4,593,970 | 6/1986  | Rhodes          | 350/96.20   |

FOREIGN PATENT DOCUMENTS 3244982  6/1984  Fed. Rep. of Germany ... 350/96.20

Primary Examiner—John Lee
Attorney, Agent, or Firm—Charles F. Pigott, Jr.

[57] ABSTRACT

A connector for fiber optical cable inluding a ductile metal sleeve, a portion of the fiber optical cable adjacent its end being positioned within the sleeve, with the end of the fiber optical cable projecting from a hole through the end of the sleeve. The portion of fiber optical cable adjacent its end is stripped of substantially all insulation and sheathing, while a resilient tubular insert surrounds such portion which is adjacent the cable end, the tubular insert in turn being positioned within the metal sleeve. The metal sleeve is crimped to hold the sleeve, tubular insert, and stripped adjacent end portion together in immovable relation. By means of this invention connectors may be placed on optical cable, capable of withstanding excessive cable retention, without the use of adhesives.

11 Claims, 10 Drawing Figures

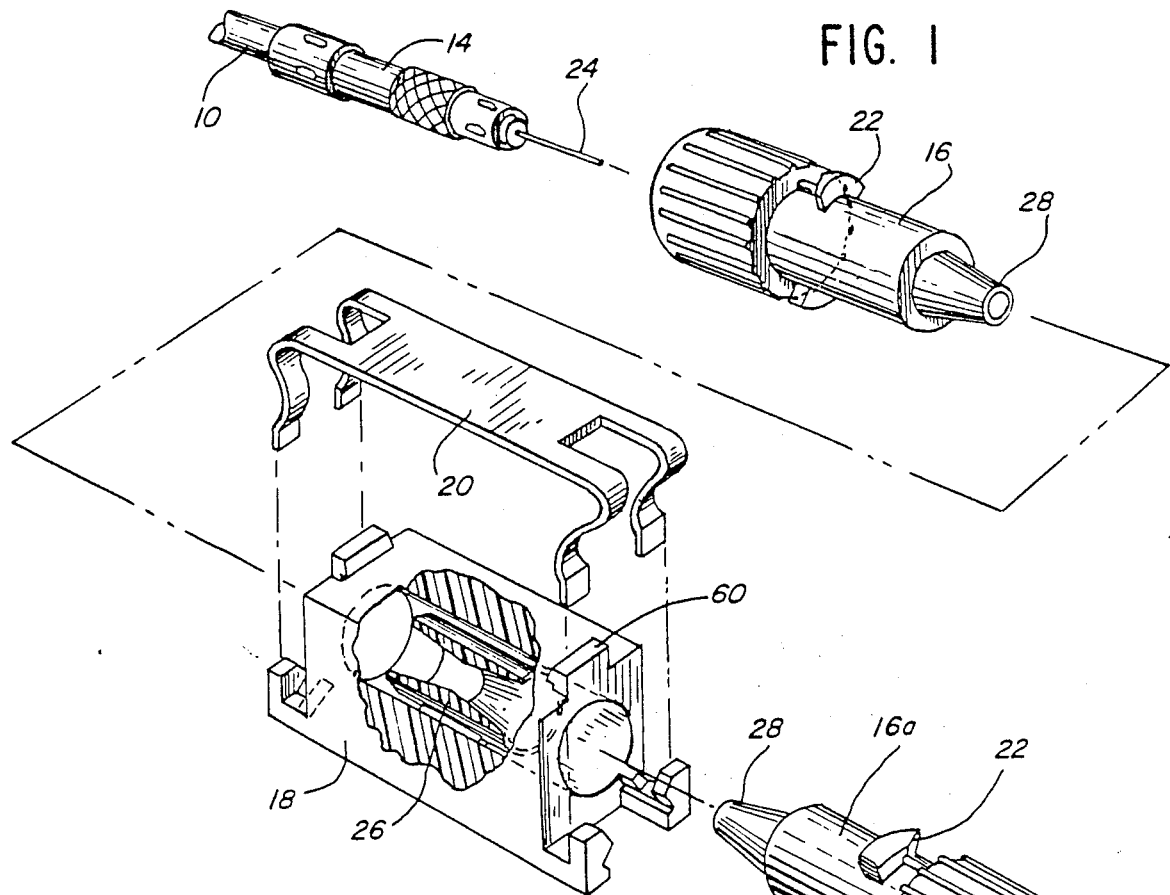
FIG. 1
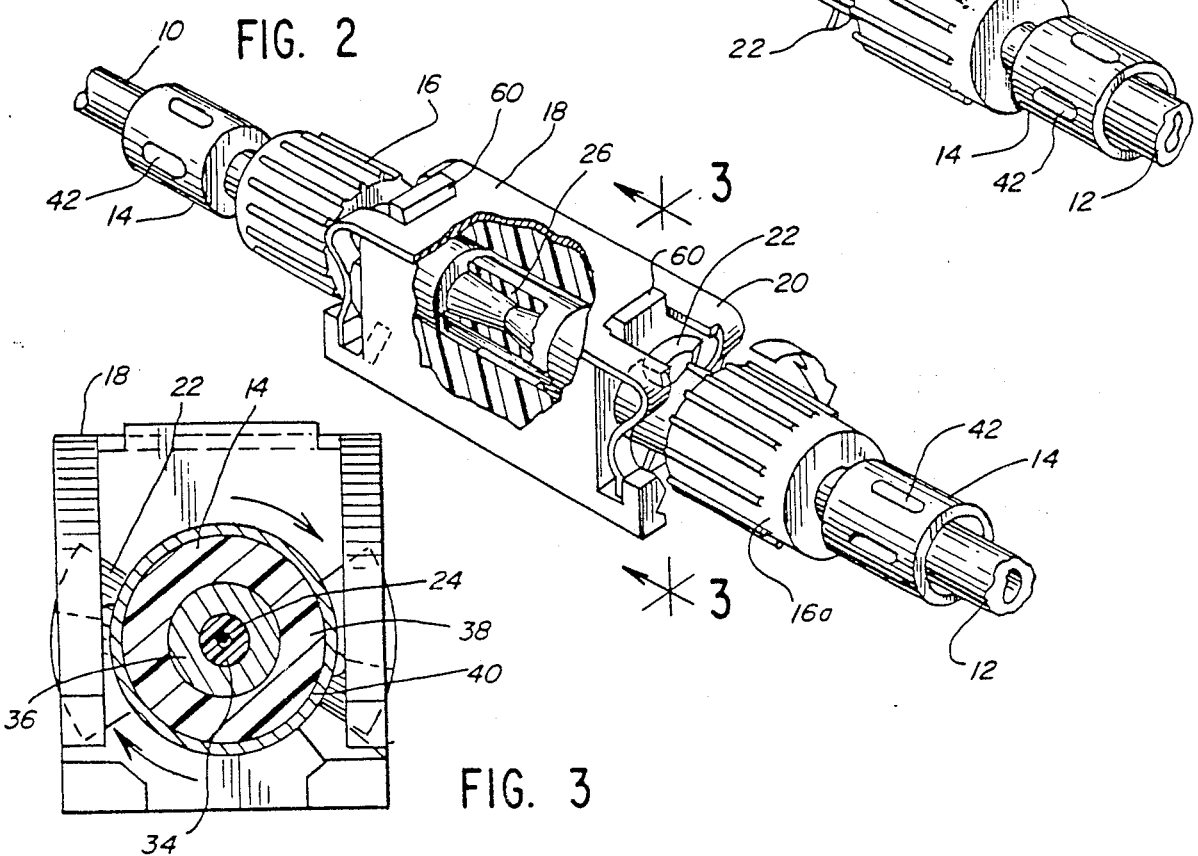
FIG. 2
FIG. 3

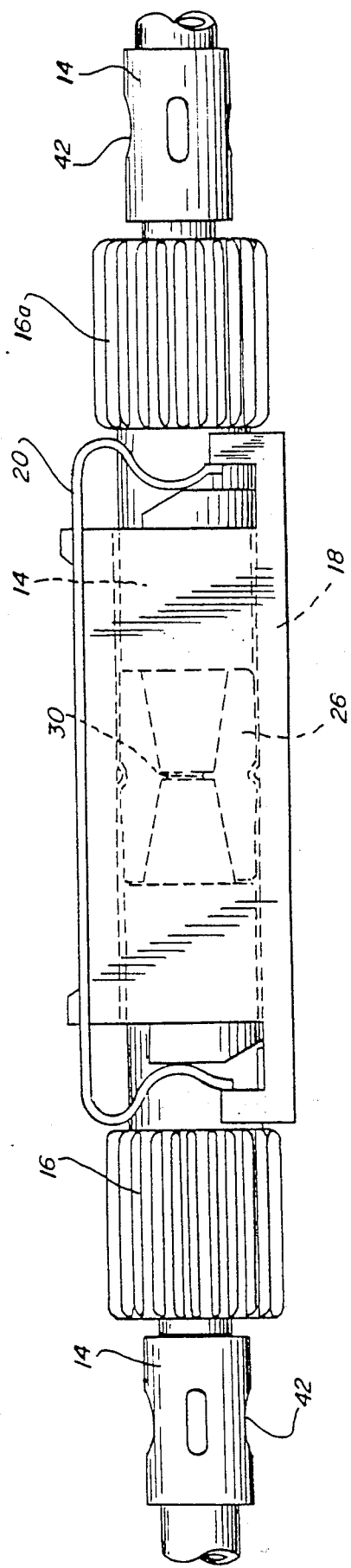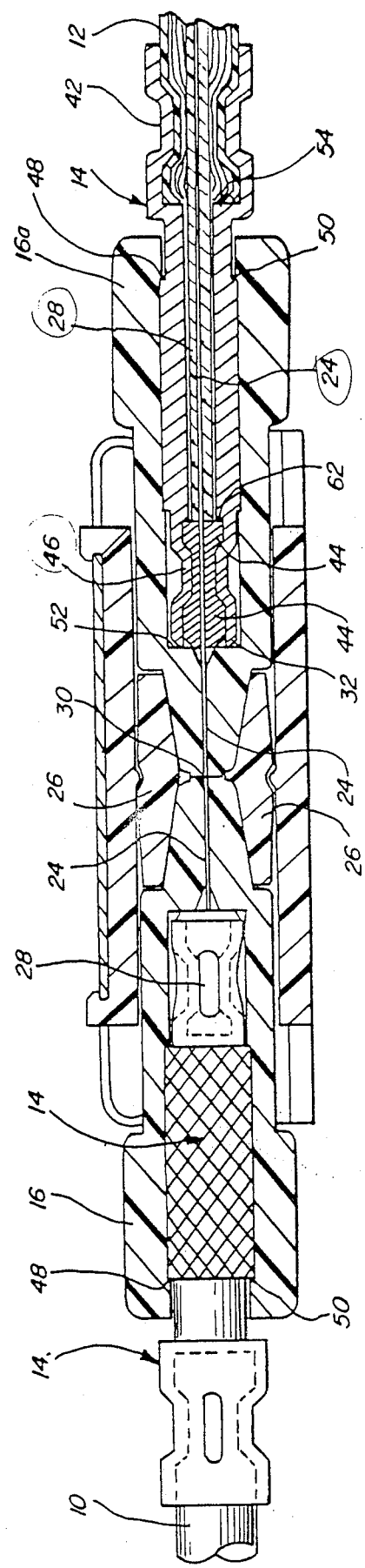
FIG. 4
FIG. 5

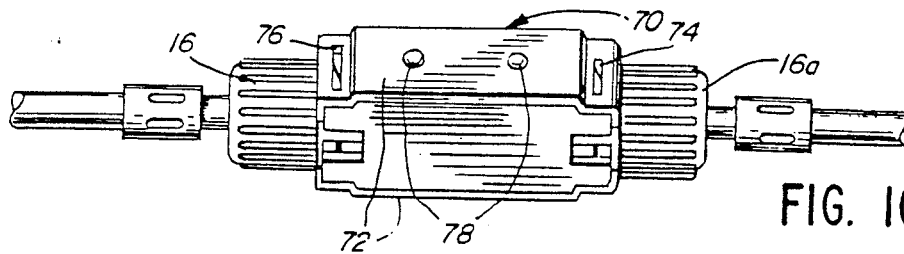
FIG. 10
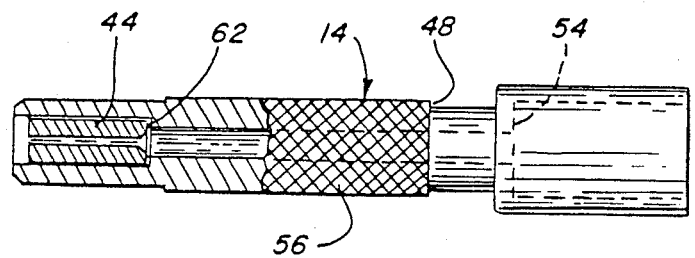
FIG. 6
FIG. 7
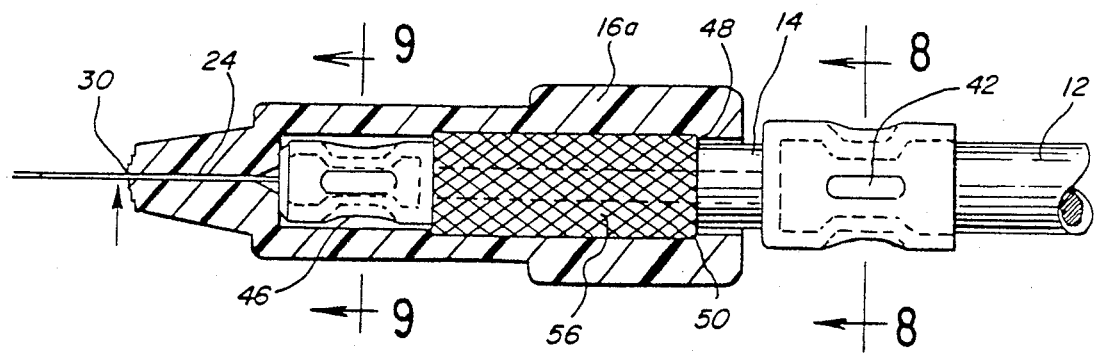
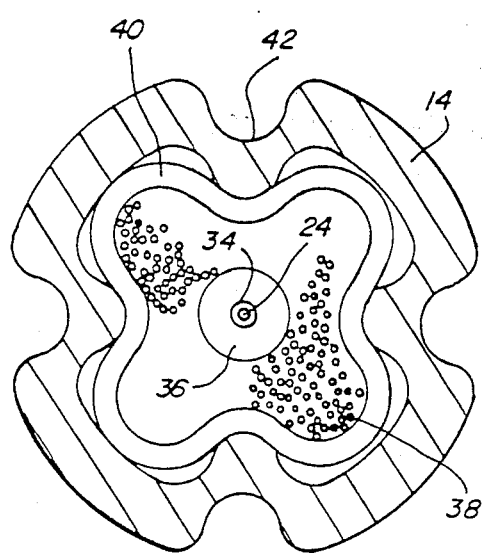
FIG. 8
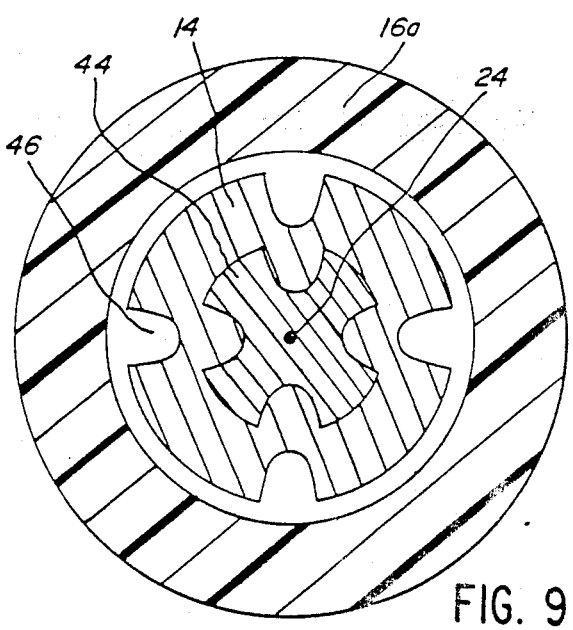
FIG. 9

CRIMP TYPE FIBER OPTIC CONNECTOR

BACKGROUND OF THE INVENTION

Fiber optical cable systems are currently connected together by making use of a bonding agent such as epoxy adhesive to retain the fiber optical cable in its connector plug. This requires stripping of the cable, applying the epoxy adhesive, joining the cable and plug together, and then applying heat to cure the epoxy resin, a procedure which takes approximately twenty minutes. After this, the optical fiber must be cleaved at the front end of the connector and polished so that it can be joined in smooth, end-to-end relationship with another similarly treated optical fiber, for unblemished optical transmission through the optical fibers across the connection junction.

This procedure is cumbersome and difficult, because it must typically be done by mechanics at the work site where the optical fiber containing apparatus is installed. The process also takes substantial time, and is subject to failure due to improper mixing or application of the adhesive to the system.

In accordance with this invention, an improved connector system is provided, having great advantages and improvements over the prior art in the way that it is assembled. The procedure of this invention can be accomplished in about three to five minutes, which is a drastic reduction in the time necessary, when compared with prior art techniques.

DESCRIPTION OF THE INVENTION

In this invention, a connector is carried on the end of fiber optical cable with the following improvement:

The connector includes a ductile metal sleeve, a portion of the fiber optical cable adjacent its end being positioned within the sleeve, with the end of the fiber optical cable projecting from an end of the sleeve. The portion of the cable adjacent the end as previously described is stripped of substantially all insulation and sheathing.

A resilient tubular insert surrounds the adjacent end portion of the cable previously identified, with the resilient tubular insert being positioned within the metal sleeve. The metal sleeve is crimped to hold the sleeve, tubular insert, and adjacent end portion together in immovable relation.

The term "stripped of substantially all insulation and sheathing" implies that the optically transmissive fiber within the cable may be exposed to the exterior, freed of its insulation and sheathing. However, it is also contemplated by the term that the innermost layer of sheathing in typical optical cables, the so-called cladding, may be retained on the optically transmissive fiber.

The invention of this application may be used with conventional optical fiber cable containing an inner, cladding around the optical fiber which, in turn, is surrounded by a hard buffer coating of known composition. That in turn is surrounded by Kevlar fibers or the like. Such optical fiber cables are available, for example, from the Siecor Co. of Hickory, N.C.

In this invention, the ductile metal sleeve may be positioned in the bore of a tubular plug member, which is the connector plug that may be manually gripped by the user for making and breaking connection. The end of the fiber optical cable may be positioned at or slightly outside of the end of the tubular plug member which faces away from the cable. Thus, the plug member may be inserted into a tubular receptacle employing a multiconical symetrical insert, where it is held in abutting, face-to-face relation with a similarly constructed optical connector plug. Metal spring clips may hold the two plug members together in opposing relation within the receptacle.

The ductile metal sleeve may surround an inner portion of the fiber optical cable which carries sheathing. The metal sleeve is advantageously crimped to hold the sleeve and inner portion of the fiber optical cable together in immovable relation. Thus, preferably, in accordance with this invention crimped areas are provided in the ductile metal sleeve, one in a stripped cable area, and another in an unstripped cable area to capture the soft buffer and the rest of the sheathing and insulating portion of the cable.

In this circumstance the part of the ductile metal sleeve which surrounds the sheathing-carrying inner portion of the fiber optical cable may define a bore of larger diameter than the part of the ductile metal sleeve which surrounds the adjacent end portion of the cable which is free of substantially all insulation and sheathing. Thus the metal sleeve can provide snug fitting for both portions in the respective sleeve parts.

Further in accordance with this invention, a method is described for securing a connector on fiber optical cable, with the fiber optical cable comprising central fiber optical filament means surrounded by casing means.

By this method, the casing means is stripped from an area adjacent the end of the cable to expose the fiber optical filament means. As previously stated, the innermost coating, e.g., the cladding, must be retained.

One then surrounds the adjacent, stripped area with a ductile metal sleeve, while overlapping an unstripped portion of the cable adjacent the stripped portion with the same metal sleeve. One allows the end of the stripped portion to project out of the metal sleeve. One then crimps the metal sleeve at a location over the unstripped portion for retention together.

One threads a resilient tubular insert over the fiber optical filament means, passing the insert into the metal sleeve, or, equivalently, the tubular insert may be positioned within the metal sleeve and one may thread the fiber optical filament through it.

One also crimps the metal sleeve at a location over the tubular insert, for retention together of the metal sleeve, resilient insert, and fiber optical filament.

One then places the metal sleeve into the bore of a tubular plug member employing mechanical retention means in such a manner that the end of the stripped portion projects out of the forward end of the plug member.

One then prepares an end of the stripped portion, typically by cleaving and breaking off the optical filament, at a position outside of an immediately adjacent the forward end of the plug member, followed by polishing of the prepared optical filament end in conventional manner.

It is to be understood that the steps of the above method do not necessarily have to be performed in exactly the order stated, but they may be performed in any reasonable and appropriate order.

For use, one may bring and lock a pair of plug members made as above into end-to-end relation, so that the polished optical filament ends oppose each other for light transmission therethrough.

By this invention, numerous advantages are achieved over the prior art.

This invention provides excellent strain relief on the casing of the fiber optical cable, while permitting easier insertion of the glass filament into the alignment portion of the plug member.

Also the optically transmissive filament is captured by this invention without placing undue stress on the filament wall. No epoxy resin or any other bonding agent is required and, accordingly, the need for heat to cure the bonding agent is eliminated. This, in turn, prevents the build up of stresses associated with the adhesive bonding techniques currently used. Likewise, excessive adhesive can contribute to losses of optical transmission, a problem which is avoided by this invention.

Furthermore, by this invention one may precisely control the strength of axial retention of the connector on the cable by precise control of the depth and length of the crimp area or areas. When one uses adhesives, the retention force may be less predictable and reliable, due to variations in the amount of adhesive used and inconsistencies in the blending and cure of the adhesive.

DESCRIPTION OF DRAWINGS

Referring to the drawings,

FIG. 1 is an exploded, perspective view of a fiber optical connector system in accordance with this invention, with a portion broken away.

FIG. 2 is a perspective view of the fiber optical system of FIG. 1 shown in its connected relation, with a portion broken away.

FIG. 3 is a sectional view taken along line 3—3 of FIG. 2.

FIG. 4 is a side elevational view of the structure shown in FIG. 2.

FIG. 5 is a longitudinal sectional view of the structure of FIG. 4.

FIG. 6 is an elevational view, taken partly in longitudinal section, of a ductile metal sleeve used in the assembly of FIGS. 1-5 prior to assembly and crimping.

FIG. 7 is an elevational view of a connector assembly carried on the end of fiber optical cable as used in FIGS. 1-5, with the plug member shown in longitudinal section.

FIG. 8 is a sectional view taken along line 8—8 of FIG. 7.

FIG. 9 is a sectional view taken along line 9—9 of FIG. 7.

FIG. 10 is a perspective view of an alternate design of receptacle for holding the plug members in opposing relation.

DESCRIPTION OF SPECIFIC EMBODIMENTS

Referring to the drawings, a connector system is disclosed for joining together separate lengths of fiber optical cable 10, 12. To this end, a ductile metal sleeve 14, made out of aluminum for example, is crimped at a position 46 (see FIG. 5) adjacent the end of each length of optical cable 10, 12. Tubular plug members 16, 16a snap onto the end of each ductile metal sleeve 14. Plug members 16, 16a are held in opposing relation within tubular receptacle 18 by the action of metal spring clips 20 which can retain plug members 16, 16a in their opposing relationship within receptacle 18 in a conventional manner. Lugs 22 can permit rotational locking of plug members 16, 16a in position so that polished ends of stripped optical filament 24 oppose one another for good optical transmission across the junction between the respective filaments. Central multiconical sleeve 26 helps to retain the forward opposing ends 28 of plug members 16, 16a in precisely positioned, opposed relation so that the ends of filaments 24 also opposed each other.

Referring particularly to FIGS. 5-9, and particularly FIG. 5, ductile metal sleeve 14 carries stripped portion 24 of optical cable 10, 12 within sleeve 14 with end 30 of the fiber optical filament 24 projecting from end 32 of sleeve 14. As stated, the adjacent end portion 28 of the fiber optical cable is stripped of substantially all insulation and sheathing. The insulation and sheathing of a typical cable may be seen in FIG. 8, with optical filament 24, cladding 34, buffer 36, and fibrous sheath 38 such as Kevlar being shown there. Outer casing 40 is also shown.

As shown, ductile sleeve 14 may have a crimped area 42 which presses upon cable 12 at a sheathed area for retention of the sheathing, such as the buffer and fibrous material. Additionally, a resilient tubular insert 44 is provided, surrounding at least some of the stripped adjacent end portion 28 of cable 12 and positioned within ductile metal sleeve 14. There also crimp 46 has been provided to hold sleeve 14, tubular insert 44, and adjacent end portion 28 together in immovable relation. A very high pull force is required to cause sleeve 14 to separate from either of cables 10 or 12.

As shown in the drawings, each of ductile metal sleeves 14 is positioned in the bore of a tubular plug member 16 or 16a, with the end 30 of fiber optical cable being positioned at or slightly outside of the end of the respective tubular plug member 16 which faces away from its cable 10 or 12. Sleeve 14 may be retained within its respective plug 16 or 16a by a snap or press fit relationship. For example, annular ledge 48 (FIG. 5) is provided in ductile metal sleeve 14 in a position to mate with a corresponding internal annular ledge 50 of both plugs 16 and 16a. Plugs 16, 16a may have sufficient resilience so that ductile sleeves 14 will slide into the respective plugs, and be retained therein by snap or press fit relation due to the interaction of annular ledges 48, 50. Ledges 48, 50 are so positioned that the front end 32 of sleeve 14 abuts against forward inner wall 52 (FIG. 5) of each plug 16, 16a.

It can be seen from FIG. 5, for example, that the part of ductile metal sleeve 14 which surrounds the sheathing-carrying inner portion of fiber optical cable 12 has a bore of larger diameter than the part of sleeve 14 which surrounds adjacent end portion 28 of cable 12 which is free of substantially all insulation and sheathing. Annular step 54 is positioned between the differently sized bores.

Ductile metal sleeve 14 may also have a central portion 56 (FIGS. 6 and 7) which has an outer surface of roughened and enlarged diameter with respect to adjacent portions, for frictional retention of sleeve 14 with the wall of the bore of plug 16 or 16a.

As shown in FIG. 7, optical fiber 24 is of a length to extend beyond plug 16 or 16a, at least in an intermediate step of assembly.

A connector may be placed on optical cable in accordance with this invention in the following way:

One strips the casing means from the areas of each of cables 10, 12 adjacent the ends thereof to expose the fiber optical filament 24. Alternatively the fiber optical filament remains encased in its hard buffer. One may remove the hard buffer with an appropriate solvent in known manner.

Typically, the connector of this invention is assembled by first placing resilient tubular insert 44 into the bore of sleeve 14. It can be seen that insert 44 may be properly positioned by the presence of annular step 62 (FIG. 5) in the bore of sleeve 14 so that insert 44 is properly retained. Insert 44 may be made of any generally resilient material appropriate for the purpose.

One then threads each stripped cable end through ductile metal sleeve 14, causing sleeve 14 to overlap and enclose an unstripped portion of the optical cable, and also allowing the end of the stripped optical cable portion 24 to project out of sleeve 14. If resilient tubular insert 44 is not initially placed in position in sleeve 14 so that it is naturally threaded around the fiber optical filament 24 as filament 24 is passed through sleeve 14, resilient insert 44 may be put into position at any later time prior to the crimping step.

Crimps 42, 46 are then formed as previously described in sleeve 14 at their appropriate positions; see FIGS. 5 and 7. Typically, crimp 46 may be applied first, or both crimps applied simultaneously. Thus, cable 12 is affixed by crimping at two different places. At crimp 46 the stripped fiber 24 is affixed and retained with the pressure seal provided by crimp 46, while a casing-carrying portion of cable 12 is held affixed by crimp 42.

Each sleeve 14 is then placed into the bore of one of tubular plug members 16, 16a and snapped into place in the manner previously described.

Following this, one prepares an end 30 (FIG. 7) of the optical filament 24 at a position outside of and immediately adjacent the forward end of each plug member 16, 16a typically by cleaving and breaking in conventional manner at a position about 0.003 inch outside of the ends of plug members 16 and 16a. One then polishes ends 30 in conventional manner, making sure that the ends do not become recessed with respect to plugs 16, 16a, but is at least flush or projecting slightly therefrom.

Accordingly, the connection means on each of optical cables 10, 12 can be completed and ready for use with a procedure that typically takes no more than five minutes. Workers on the site of installation of devices using such optical cable can experience a great time reduction in their installation activities.

One may then lock plug members 16, 16a together in end-to-end relation as shown in FIGS. 2, 4 and 5 so that the optical filament ends 30 oppose each other, for efficient light transmission therethrough. Particularly, plug members 16, 16a oppose each other in tubular receptacle 18, and retained there by spring clips 20, which fit on receptacle 18 in snap-fit relation by means of projections 60. Plug members 16, 16a may be retained by the action of spring clips 20 and lugs 22, which are carried on plug members 16, 16a. Each of plug members 16, 16a may be removed from their opposing relation simply by 90° rotation to free lugs 22 from their engagement with spring clips 20, permitting withdrawal and subsequent re-engagement by insertion and rotation of the lugs 22 back into engagement with spring clips 20.

Referring to FIG. 10, a tubular plastic receptacle 70 of rectangular cross-section is disclosed, serving as a substitute for receptacle 18 and spring clip 20, for holding plug members 16, 16a in their opposing relation as in the previous embodiment. As before, a central multiconical sleeve similar to sleeve 26 may reside in the bore of receptacle 70 to asssist in centering and orienting the plug members 16, 16a.

Each side of receptacle 70 carries a metal strip 72, each being of similar design and carrying slots 74, 76 adjacent each end thereof. It can be seen that slots 74, 76 are of different length, being proportioned for appropriate engagement with lugs 22 of each plug member 16, 16a. The positions of the different length slots 74, 76 are reversed on the metal strip 72 opposed from the strip 72 which is fully shown in FIG. 10.

Snap fit projections 78 pass through apertures of each metal strip 72 to cause each strip to be retained on receptacle 70.

Accordingly, the receptacle 70 functions in a manner equivalent to the previously described receptacle 18, but exhibits certain advantages, including the fact that no separable metal spring clip is required.

The above has been offered for illustrative purposes only, and is not intended to limit the scope of the invention of this application, which is as defined in the claims below.

That which is claimed is:

1. A fiber optic connector terminating a length of fiber optic cable having a central fiber optic core covered by cladding, a buffer outside of the cladding, and additional layers of material covering the buffer, said connector comprising, in combination, a ductile metal sleeve fitted over an end of said fiber optic cable, an outermost end of said cable being stripped of all material outside of said cladding and said outermost end projecting through an outer end of said ductile metal sleeve, a resilient tubular insert positioned within said outer end of said ductile metal sleeve to surround a portion of said outermost end of said cable which portion is within said ductile metal sleeve, and said ductile metal sleeve being crimped at the location of said resilient tubular insert to hold said sleeve, said insert and said outermost end of said cable in immovable relation.

2. A fiber optic connector terminating a length of fiber optic cable having a central fiber optic core covered by cladding, a buffer outside of the cladding, and additional layers of material covering the buffer, said connector comprising, in combination, a fiber optic cable end having a first outermost end portion stripped of all material outside of said cladding, a second intermediate end portion stripped of all material outside of said buffer and a third cable end portion which includes additional layers of material outside of said buffer, a ductile metal sleeve extending over said first, second and third cable end portions leaving an extreme end of said first portion projecting through the outer end of said sleeve, a resilient tubular insert positioned within the outer end of said ductile metal sleeve to surround said first outermost end portion of said cable which is within said sleeve, said ductile metal sleeve being crimped at the location of said resilient tubular insert to hold said sleeve, said insert and said first outermost end portion in immovable relation, and said ductile metal sleeve also being crimped at the location of said third cable end portion.

3. A fiber optic connector as defined in claim 2 where said resilient tubular insert has an inner end which is closely adjacent the outer end of said second intermediate end portion which is stripped of all material outside of said buffer, said inner end of said insert being closely adjacent an outer end of said buffer.

4. A fiber optic connector as defined in claim 3 where the outer end of said resilient tubular insert is approximately co-extensive with the outer end of said ductile metal sleeve.

5. A fiber optic connector terminating a length of fiber optic cable having a central fiber optic core covered by cladding, a buffer outside of the cladding, and additional layers of material covering the buffer, said connector comprising, in combination, ductile metal sleeve means fitted over an end of said fiber optic cable, the outermost end of said cable being stripped of all material outside of said cladding and said outermost end projecting through an outer end of said ductile metal sleeve means, a resilient tubular insert positioned within said outer end of said ductile metal sleeve means to surround a portion of said outermost end of said cable which portion is within said ductile metal sleeve means, and said ductile metal sleeve means being crimped at the location of said resilient tubular insert to hold said sleeve, said insert, and said outermost end of said cable in immovable relation, an inner end of said ductile metal sleeve means covering a portion of said fiber optic cable including said additional layers of material outside said buffer, at least a portion of said ductile metal sleeve means being crimped in an area to engage said additional layers of material.

6. A fiber optic connector terminating a length of fiber optic cable having a central fiber optic core covered by insulating material, said connector comprising, in combination, a ductile metal sleeve fitted over an end of said fiber optic cable, the outermost end of said cable being stripped of insulation, a resilient tubular insert positioned within the outer end of said ductile metal sleeve to surround only the stripped outermost end of said cable within said ductile metal sleeve, said ductile metal sleeve being crimped at the location of said resilient tubular insert to hold said sleeve, said insert, and a portion of said cable in immovable relation to abut a projecting end of another length of fiber optic cable.

7. The fiber optic connector of claim 6 in which said central fiber optic core is covered by cladding along most of its length, a buffer outside of said cladding and additional layers of material covering the buffer as insulating material, an inner end of said ductile metal sleeve covering a portion of said fiber optic cable including said insulating material, a portion of said inner end of the ductile metal sleeve being crimped in the area of said insulating material.

8. A fiber optic connector terminating a length of fiber optic cable having a central fiber optic core covered by cladding, a buffer outside of the cladding, and additional layers of material covering the buffer, said connector comprising, in combination, a fiber optic cable end having a first, outermost end portion stripped of all material outside of said cladding, a second, intermediate end portion stripped of all material outside of said buffer, and a third cable end portion which includes additional layers of material outside of said buffer, ductile metal sleeve means extending over said first, second, and third cable end portions, a resilient tubular insert positioned within the outer end of said ductile metal sleeve means to surround at least a portion of said first, outermost end portion of said cable which is within said sleeve means, said ductile metal sleeve means being crimped at the location of said resilient tubular insert to hold said sleeve means, said insert, and said first outermost end portion in immovable relation, and said ductile metal sleeve means being also crimped at the location of said third cable end portion, whereby said first, outermost cable end portion can abut the end of another optic cable for optical connection.

9. A fiber optic connector as defined in claim 8 where said ductile metal sleeve is formed with a roughened outer portion intermediate the two crimped portions to assist in retaining said sleeve within a connector plug.

10. A fiber optic connector as defined in claim 8 where said resilient tubular insert has an inner end which is closely adjacent the outer end of said second intermediate end portion which is stripped of all material outside of said buffer, said inner end of said insert being closely adjacent an outer end of said buffer.

11. A fiber optic connector as defined in claim 10 where the outer end of said resilient tubular insert is approximately co-extensive with the outer end of said ductile metal sleeve.

* * * * *